United States Patent
Liu

(10) Patent No.: US 10,196,188 B2
(45) Date of Patent: Feb. 5, 2019

(54) ELECTRONIC CIGARETTE SEALING PIECE FOR ADDING LIQUID BY INJECTION, LIQUID CONTAINER AND ELECTRONIC CIGARETTE

(71) Applicant: SHENZHEN BUDDY TECHNOLOGY DEVELOPMENT CO., LTD, Guangdong (CN)

(72) Inventor: Xiang Liu, Guangdong (CN)

(73) Assignee: SHENZHEN BUDDY TECHNOLOGY DEVELOPMENT CO., LTD, Guangdong (CN)

( * ) Notice: Subject to any disclaimer, the term of this patent is extended or adjusted under 35 U.S.C. 154(b) by 0 days.

(21) Appl. No.: 15/542,932

(22) PCT Filed: Jan. 23, 2015

(86) PCT No.: PCT/CN2015/071407
§ 371 (c)(1),
(2) Date: Jul. 12, 2017

(87) PCT Pub. No.: WO2016/112561
PCT Pub. Date: Jul. 21, 2016

(65) Prior Publication Data
US 2018/0022516 A1 Jan. 25, 2018

(30) Foreign Application Priority Data

Jan. 16, 2015 (CN) ..................... 2015 2 0030183 U

(51) Int. Cl.
*A24F 13/00* (2006.01)
*B65D 51/00* (2006.01)
(Continued)

(52) U.S. Cl.
CPC .......... *B65D 51/002* (2013.01); *A24F 47/002* (2013.01); *A24F 47/008* (2013.01); *F16L 15/04* (2013.01)

(58) Field of Classification Search
CPC ... A24F 47/002; A24F 47/008; B65D 51/002; F16L 15/04
(Continued)

(56) References Cited

U.S. PATENT DOCUMENTS 4,499,148 A * 2/1985 Goodale ............. B29C 66/7392
106/287.1
5,647,939 A * 7/1997 Gee ................... B29C 66/72343
156/272.6

(Continued)

FOREIGN PATENT DOCUMENTS

CN 202445134 9/2012
CN 103750570 4/2014
(Continued)

OTHER PUBLICATIONS

"International Search Report (Form PCT/ISA/210)", dated Oct. 21, 2015, with English translation thereof, pp. 1-4.

Primary Examiner — Hae Moon Hyeon
(74) Attorney, Agent, or Firm — JCIPRNET

(57) ABSTRACT

An electronic cigarette sealing piece, a liquid container and an electronic cigarette are provided. The electronic cigarette sealing piece includes a silicone substrate and a Teflon coating layer coated on a surface of the silicone substrate. The liquid container includes a liquid container main body provided with a liquid adding opening thereon, the liquid adding opening is provided with the electronic cigarette sealing piece for adding liquid by injection, the liquid container main body seals the liquid adding opening with the electronic cigarette sealing piece for adding liquid by injection, and the Teflon coating layer of the electronic cigarette (Continued)

sealing piece for adding liquid by injection is provided at an inner side of the liquid adding opening. The electronic cigarette includes an electronic cigarette main body having the liquid container.

6 Claims, 3 Drawing Sheets

(51) Int. Cl.
*A24F 47/00* (2006.01)
*F16L 15/04* (2006.01)

(58) Field of Classification Search
USPC .................................................. 131/328, 329
See application file for complete search history.

(56) References Cited

U.S. PATENT DOCUMENTS

| | | | |
|---|---|---|---|
| 9,955,734 B2* | 5/2018 | Lin | ........................ A24F 47/008 |
| 2016/0128385 A1* | 5/2016 | Lin | ........................ A24F 47/002 |
| | | | 131/328 |
| 2016/0286860 A1* | 10/2016 | Flayler | .................. A24F 47/008 |

FOREIGN PATENT DOCUMENTS

| | | |
|---|---|---|
| CN | 203723443 | 7/2014 |
| CN | 203851815 | 10/2014 |
| EP | 2614731 | 7/2013 |

\* cited by examiner

ELECTRONIC CIGARETTE SEALING PIECE FOR ADDING LIQUID BY INJECTION, LIQUID CONTAINER AND ELECTRONIC CIGARETTE

CROSS-REFERENCE TO RELATED APPLICATION

This application is a 371 application of the International PCT application serial no. PCT/CN2015/071407, filed on Jan. 23, 2015, which claims the priority benefit of China application no. 201520030183.1, filed on Jan. 16, 2015. The entirety of each of the above-mentioned patent applications is hereby incorporated by reference herein and made a part of this specification.

FIELD OF INVENTION

The present invention relates to products of electronic cigarette, and more particular to an electronic cigarette sealing piece for adding liquid by injection, a liquid container, an electronic cigarette.

DESCRIPTION OF RELATED ARTS

At present, in electronic cigarette, tobacco tar is generally used as atomization for heating to produce smoke. In order to improve the life of electronic cigarettes, the liquid container (such as smoke bombs) of the electronic cigarette is provided with a liquid adding opening and a liquid adding plug additional, wherein the liquid adding plug is to be pulled out of the liquid adding opening when it is required to add liquid, and the liquid adding plug is to be plugged into the liquid adding opening after the liquid adding process is done. However, the structure of such liquid container has the following shortcomings: (1) the fit between the liquid adding plug and the liquid adding opening directly affect the sealing structure of the liquid container; if the liquid adding plug and the liquid adding opening are aged, or deformed, or worn, it may easily cause the fit between the liquid adding plug and the liquid adding opening to become untight, thereby resulting in a leakage in the liquid container. (2) In order to achieve the sealing fit between the liquid adding plug and the liquid adding opening, to prevent that the manufacturing error, which is caused by the liquid adding plug and the liquid adding opening, from influencing the precision of the fit between the liquid adding plug and the liquid adding opening, the processing technology requirements of the liquid adding plug and the liquid adding opening are stringent. (3) As for the liquid container, the installation and fixed structure of the liquid adding plug should prevent the liquid adding plug from dropping out, leading to a complex structure of the liquid container, causing cumbersome in processing and assembling, and resulting in high production costs.

SUMMARY OF THE PRESENT INVENTION

The invention is advantageous in that it provides an electronic cigarette sealing piece for adding liquid by injection, a liquid container, an electronic cigarette, which have the advantages of no leakage, simple in structure, convenient in processing and assembling, and low in production cost.

According to the present invention, the foregoing and other objects and advantages are attained by an electronic cigarette sealing piece for adding liquid by injection, including a silicone substrate and a Teflon coating layer coated on a surface of the silicone substrate.

In some embodiments, the silicone substrate has a thickness of 0.8-1.5 mm, and the Teflon coating layer has a thickness of 0.05-0.2 mm.

In accordance with another aspect of the invention, the foregoing and other objects and advantages are also attained by a liquid container, including a liquid container main body, the liquid container main body is provided with a liquid adding opening thereon, the liquid adding opening is provided with the electronic cigarette sealing piece for adding liquid by injection, the liquid container main body seals the liquid adding opening with the electronic cigarette sealing piece for adding liquid by injection, and the Teflon coating layer of the electronic cigarette sealing piece for adding liquid by injection is provided at an inner side of the liquid adding opening.

In some embodiments, an external thread pipe is provided on the liquid container main body at an end close to the liquid adding opening, the external thread pipe is provided with an inner threads cap which is threaded connect with the external thread pipe, wherein the inner threads cap is provided with a needle jack, the electronic cigarette sealing piece for adding liquid by injection is clamped and fixed between the inner side of the inner threads cap and the end face of the external thread pipe.

In accordance with another aspect of the invention, the foregoing and other objects and advantages are also attained by an electronic cigarette includes an electronic cigarette main body, and the electronic cigarette main body includes the liquid container mentioned above.

Compared with the prior art, the electronic cigarette sealing piece for adding liquid by injection in present invention has the following advantages:

The electronic cigarette sealing piece for adding liquid by injection includes a silicone substrate and a Teflon coating layer coated on a surface of the silicone substrate, using a syringe to add liquid into the electronic cigarette; when the syringe needle of the syringe is inserted into the electronic cigarette sealing piece, an adding process is carried out. When the syringe needle of the syringe is pulled out of the electronic cigarette sealing piece, due to the deoiling character of Teflon materials and self-sealing character of silicone substrate, the sealing effect of the electronic cigarette sealing piece is being achieved, preventing the liquid leak out from the needle eye of the syringe needle effectively, avoiding the leakage. The problems in related art, such as easy aging in liquid adding structure, strict in processing and assembling are not existed in present invention. On the contrary, the present invention is simple in processing and assembling, and has the advantage of no leakage, simple in structure, convenient in processing and assembling, and low in production cost.

The liquid container in present invention includes the electronic cigarette sealing piece for adding liquid by injection. Therefore, the advantages of the liquid container are the same with the electronic cigarette sealing piece for adding liquid by injection.

The electronic cigarette in present invention includes an electronic cigarette main body, and the electronic cigarette main body includes the liquid container mentioned above. Therefore, the advantages of the electronic cigarette are the same with the electronic cigarette sealing piece for adding liquid by injection.

DETAILED DESCRIPTION OF THE PREFERRED EMBODIMENT

Figure 1:
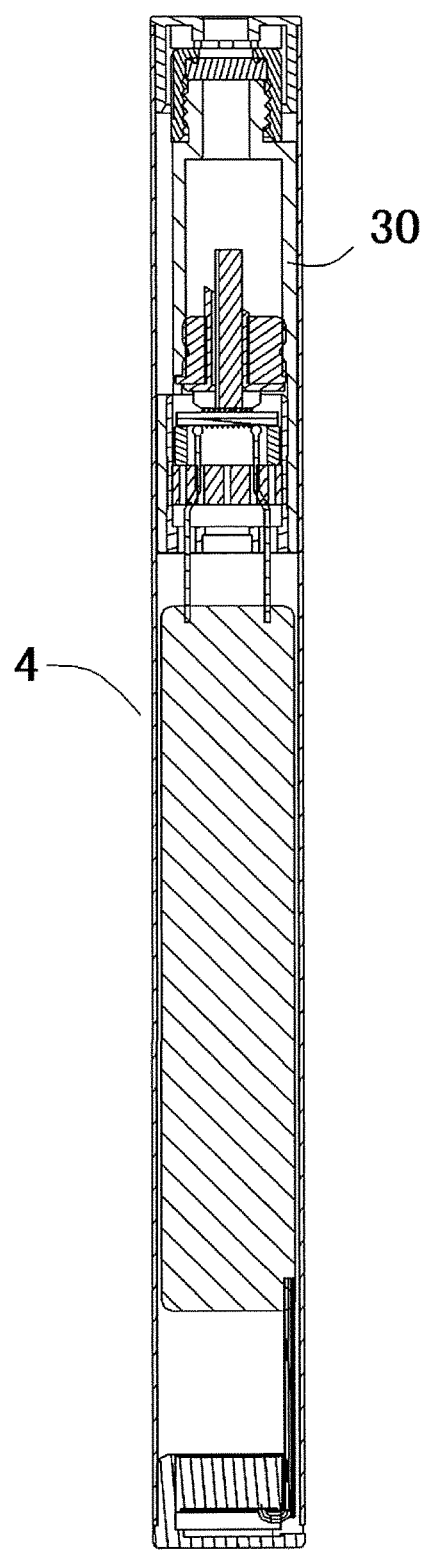
FIG. 1 is a schematic cross-sectional view of an electronic cigarette according to an embodiment of the present invention.

As shown in FIG. 1, an electronic cigarette in the present embodiment includes an electronic cigarette main body 4, and electronic cigarette main body 4 includes a liquid container 30.

Figure 2:
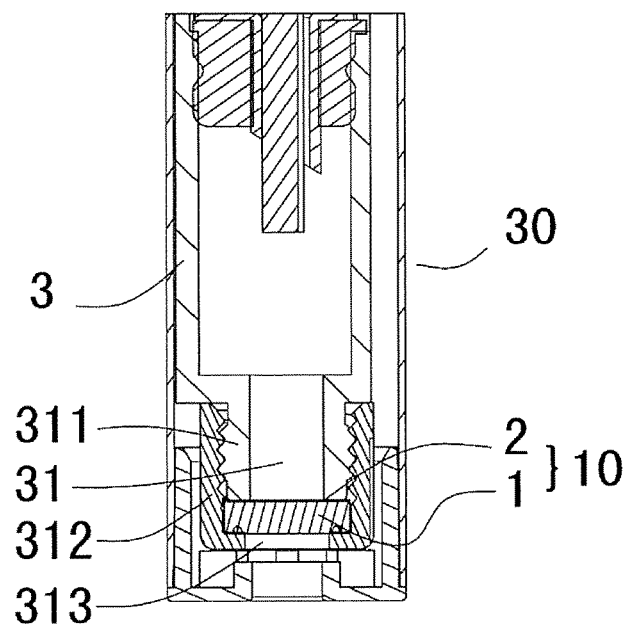
FIG. 2 is a schematic cross-sectional view of a liquid container according to an embodiment of the present invention.
Figure 3:
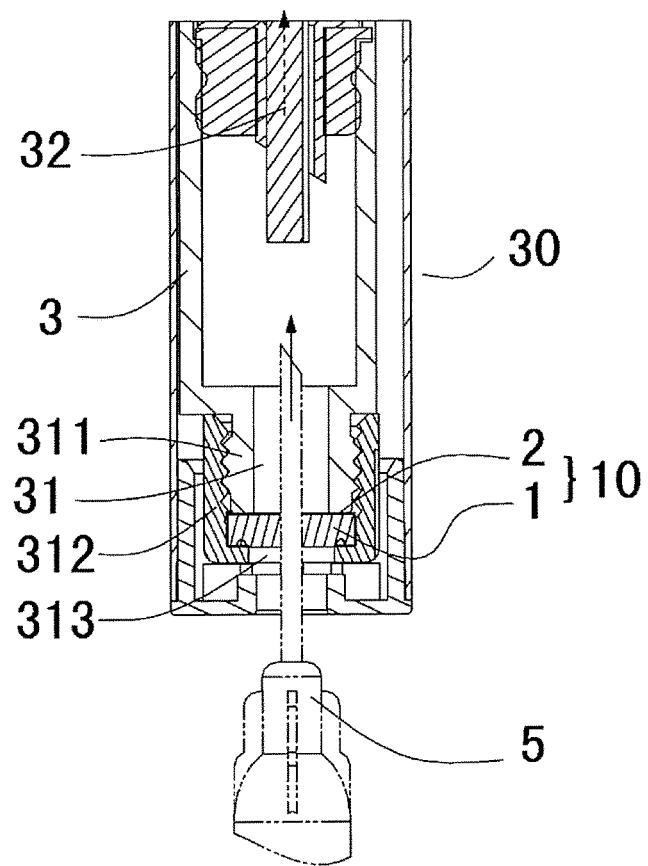
FIG. 3 is a schematic cross-sectional view of adding liquid to a liquid container by using a syringe according to the embodiment of the present invention.

As shown in FIGS. 2 and 3, the liquid container in the present embodiment includes a liquid container main body 3 provided with a liquid adding opening 31 thereon; the liquid adding opening 31 is provided with the electronic cigarette sealing piece for adding liquid by injection 10 as mentioned below; the liquid container main body 3 can seal the liquid adding opening 31 with the electronic cigarette sealing piece for adding liquid by injection 10.

As shown in FIG. 3, when the liquid container 30 needs to be added with liquid, the liquid container 30 is inverted so that the electronic cigarette sealing piece for adding liquid by injection 10 is located at the lower end, and one end of the liquid container 30 for installing an atomizer is located at the upper end. Since the end of the liquid container 30 for installing an atomizer is provided with a liquid transmission channel (the liquid passing channel in the present embodiment is a fiberglass rope 32, in additional, other structures for liquid transmission could be adopted when necessary). When the syringe needle of syringe 5 is inserted into the electronic cigarette sealing piece for adding liquid by injection 10 to add liquid, liquid is injected along the solid line arrow in FIG. 3 from the syringe 5 to the inner chamber of the liquid container main body 3. In the meantime, air in the inner chamber of the liquid container main body 3 is exhausted from the liquid transmission channel which is provided at the end of the liquid container 30 for installing an atomizer (shown as the dash line arrow in FIG. 3), and then the liquid is being injected into the liquid container 30.

As shown in FIG. 2 and FIG. 3, in the present embodiment, an end of the liquid container main body 3 that is close to liquid adding opening 31 is provided with an external thread pipe 311; the external thread pipe 311 is provided with an inner thread cap 312, which is threaded to connect with the external thread pipe 311; the inner thread cap 312 is provided with a needle jack 313; the electronic cigarette sealing piece for adding liquid by injection 10 is clamped and fixed between the inner side of the inner thread cap 312 and the end face of the external thread pipe 311. By using the above structure, it is easy to install and replace the electronic cigarette sealing piece for adding liquid by injection 10. The abovementioned structure in the present embodiment is only one preferred embodiment of fixed models for the electronic cigarette sealing piece for adding liquid by injection 10. In other preferred embodiments, the electronic cigarette sealing piece for adding liquid by injection 10 can be directly fixed to the liquid adding opening 31 for sealing the liquid adding opening 31.

It should be noted that, a person who adds liquid into the liquid container 30 by using the syringe 5 though the electronic cigarette sealing piece for adding liquid by injection 10 can be a user or a producer or an assembler of the electronic cigarette. In addition, it is no doubt that the name of the liquid container 30 may be varied in different structures of the electronic cigarette, such as liquid pipe, liquid cup or liquid bomb, etc.; as long as the component is being used for containing liquid, the component is essentially the liquid container 30 in the present embodiment.

Figure 4:
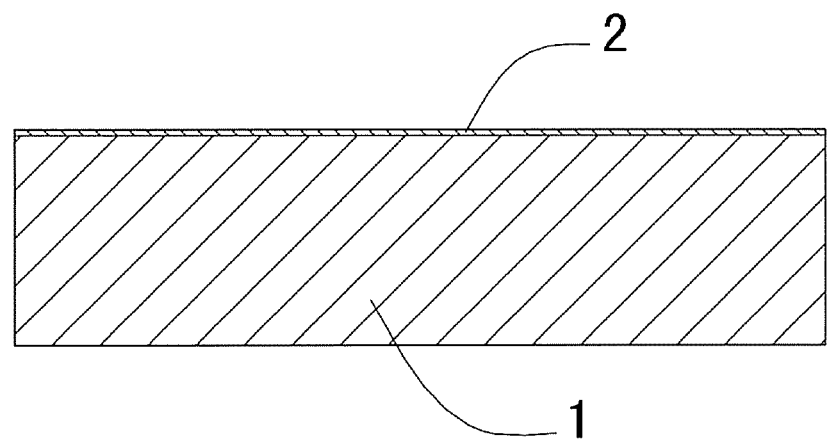
FIG. 4 is a schematic cross-sectional view of an electronic cigarette sealing piece according to an embodiment of the present invention.

As shown in FIG. 3 and FIG. 4, the electronic cigarette sealing piece for adding liquid by injection 10 in the present embodiment includes a silicone substrate 1 and a Teflon coating layer 2 coated on a surface of the silicone substrate 1. Using a syringe 5 to add liquid into the electronic cigarette, when the syringe needle of syringe 5 is inserted into the electronic cigarette sealing piece 10, an adding process is carried out. When the syringe needle of syringe 5 is pulled out of the electronic cigarette sealing piece, due to the deoiling character of Teflon materials in Teflon coating layer 2 and self-sealing character of silicone substrate 1, the sealing effect of the electronic cigarette sealing piece 10 is being achieved, preventing the liquid leak out from the needle eye of the syringe needle of syringe 5 effectively, avoiding the leakage. The problems in related art, such as easy aging in liquid adding structure, strict in processing and assembling are not existed in present invention. On the contrary, the present embodiment is simple in processing and assembling, and has the advantage of no leakage, simple in structure, convenient in processing and assembling, and low in production cost. In the present embodiment, the Teflon coating layer 2 is provided inside of the liquid adding opening 31, and due to the deoiling characteristic of Teflon materials in Teflon coating layer 2 provided inside of the liquid adding opening 31, the sealing effect of the needle eye, when the syringe needle of the syringe 5 is pulled out and the silicone substrate 1 clogs the needle eye by self-deformation, is enhanced effectively.

It is to be noted that, a thickness of the silicone substrate 1 can range from 0.8 to 1.5 mm based on the needs, and a thickness of the Teflon coating layer 2 can range from 0.05 to 0.2 mm based on the needs. As verified by experiments, when the syringe needle of syringe 5 is pulled out of the electronic cigarette sealing piece for adding liquid by injection 10, the abovementioned thicknesses of the silicone substrate 1 and the Teflon coating layer 2 can prevent liquid leakage from the needle eye of the syringe 5 better. In the present embodiment, the silicone substrate 1 has a thickness of 1 mm, and the Teflon coating layer 2 has a thickness of 0.1 mm, so the electronic cigarette sealing piece 10 has a thickness of 1.1 mm totally.

The above is only the preferred embodiment of the present invention and the scope of the present invention is not limited by the above embodiments; therefore, all of the technical solutions within the spirit of the present invention should be included within the scope of the present invention. It should be pointed out that this invention includes all modifications encompassed within the spirit and scope of the present invention; for one skilled in the art.

What is claimed is:

1. A liquid container, comprising a liquid container main body, and an electronic cigarette sealing piece for adding liquid by injection,
    wherein the electronic cigarette sealing piece for adding liquid by injection comprises a silicone substrate and a Teflon coating layer coated on a surface of the silicone substrate,
    wherein said liquid container main body is provided with a liquid adding opening thereon, the liquid adding opening is provided with the electronic cigarette sealing piece for adding liquid by injection, the liquid container main body seals the liquid adding opening with the electronic cigarette sealing piece for adding liquid by injection, and the Teflon coating layer of the electronic cigarette sealing piece for adding liquid by injection is provided at an inner side of the liquid adding opening, wherein an external thread pipe is provided on said liquid container main body at an end close the liquid adding opening, said external thread pipe is provided with an inner threads cap which is threaded connect with said external thread pipe, said inner threads cap is provided with a needle jack, and said electronic cigarette sealing piece for adding liquid by injection is clamped and fixed between the inner side of said inner threads cap and the end face of said external thread pipe.

2. An electronic cigarette, comprising an electronic cigarette main body, wherein said electronic cigarette main body comprises the liquid container as recited in claim 1.

3. An electronic cigarette, comprising an electronic cigarette main body, wherein said electronic cigarette main body comprises the liquid container as recited in claim 1.

4. A liquid container, comprising a liquid container main body, and an electronic cigarette sealing piece for adding liquid by injection, wherein the electronic cigarette sealing piece for adding liquid by injection comprises a silicone substrate and a Teflon coating layer coated on a surface of the silicone substrate, wherein the silicone substrate has a thickness of 0.8-1.5 mm, and the Teflon coating layer has a thickness of 0.05-0.2 mm, wherein said liquid container main body is provided with a liquid adding opening thereon, the liquid adding opening being provided with the electronic cigarette sealing piece for adding liquid by injection, the liquid container main body sealing the liquid adding opening with the electronic cigarette sealing piece for adding liquid by injection, and the Teflon coating layer of the electronic cigarette sealing piece for adding liquid by injection being provided at an inner side of the liquid adding opening, wherein an external thread pipe is provided on said liquid container main body at an end close to the liquid adding opening, said external thread pipe is provided with an inner threads cap which is threaded connect with said external thread pipe, said inner threads cap is provided with a needle jack, and said electronic cigarette sealing piece for adding liquid by injection is clamped and fixed between the inner side of said inner threads cap and the end face of said external thread pipe.

5. An electronic cigarette, comprising an electronic cigarette main body, wherein said electronic cigarette main body comprises the liquid container as recited in claim 4.

6. An electronic cigarette, comprising an electronic cigarette main body, wherein said electronic cigarette main body comprises the liquid container as recited in claim 4.

\* \* \* \* \*